United States Patent Office 3,488,129
Patented Jan. 6, 1970

---

3,488,129
METHOD OF BURSTING LIQUID FUEL WITH CALCIUM CARBONATE
Yoshitake Itoh, 2-271 Tamagawa Okasawa-cho, Setagaya-ku, Tokyo, Japan
No Drawing. Filed Oct. 16, 1967, Ser. No. 675,342
Int. Cl. F23j 7/00
U.S. Cl. 431—4                                    3 Claims

ABSTRACT OF THE DISCLOSURE

A self-combustion system in which liquid fuel on combustion is added with calcium carbonate in homogeneous dispersion to induce a chain-reaction of bursting.

BACKGROUND OF THE INVENTION

This invention relates to a method of bursting liquid fuel with calcium carbonate in which a predetermined quantity of calcium carbonate in particles is admixed to said liquid fuel on combustion to induce the continuous burst reaction. The term "burst" herein used means deflagration.

The present invention provides a novel method of bursting liquid fuel with calcium carbonate in which a predetermined quantity of calcium carbonate in particles is added to said liquid fuel on combustion to induce continuous burst reaction.

In the combustion, the petroleum liquid fuel essentially consisting of hydrocarbons, such as crude oil, crude gasoline (naphtha), heavy oil and the like is admixed with solid particles of calcium carbonate which is decomposed under radiant heat into carbon dioxide and calcium oxide while the said fuel is being gassified and vaporised. The carbon dioxide is in turn decomposed into nascent oxygen and carbon and the nascent oxygen catalyzes with the combustion of the gassified fuel to cause bursting or deflagration. The calcium oxide is decomposed into calcium and oxygen and in turn recombined to calcium oxide in a high temperature zone thereby producing an intensive high temperature luminescence due to reversible reaction of the said calcium oxide. The foregoing reactions are instantaneous and continuous so that the self-combustion takes place without detonation which would occur in the conventional combustion method. The calorific value of calcium carbonate as the heat generation source of the combustion can not be measured by the calorimeter, notwithstanding it may be confirmed by converting the value of vapor produced by the boiler into the equivalent calorific value. Further, calcium carbonate may be replaced by dolomite of the same amount.

According to the invention, combustible gas and the nascent oxygen are continuously supplied to the reaction zone and bursting is caused spontaneously and automatically. This bursting, i.e. the progress of the stable normal rise of temperature is based on its spontaneous chemical reaction without requiring any artificial acceleration of the combustion velocity which is relied on in the conventional method; and the rate of heat generation is always greater than that of the heat loss. The thusly generated heat, i.e. the gradually accumulated temperature is further elevated automatically to accelerate the rise of ambient temperature of the combustible material while preventing heat loss and as a result the combustion velocity is abruptly accelerated with the rise of temperature.

According to the conventional unstable combustion system which relies upon only air diffusion, the rise of temperature is not complete. On the contrary, in the mixed combustion system according to the invention, the combustible gas at the high temperature zone of combustion is supplied with sufficient active oxygen and free oxygen source introduced thereto and the explosive oxidation reaction is caused with transfer of bursting into self-combustion, and thus the combustion temperature is elevated under such a chemical condition that the rate of heat generation is far greater than that of the heat loss.

Another object of the invention is to burn the commercially available fuel contatining sulfur in its original state without entailing any of the disadvantages of the conventional single combustion system. The sulfur which is generally regarded as an impurity in combustion is converted into sulfur dioxide by combustion, which corrodes and injures the inner metal surface of the boiler, resulting in reduction of performance after combustion and reduction of durability. Further, this sulfur dioxide is discharged into the atmosphere as smog which pollutes air and is harmful to human life.

In order to remove the said toxic sulfur, desulfurization during purification of petroleum has been contrived with considerable expenses. Since, however, perfect removal of sulfur can not be attained, exhaust gasses are discharged through giant chimneys to avoid public nuisance. However, the exhaust gases are eventually diffused and diluted in the atmosphere. Even provided that the recovery and removal of these polluting factors could be achieved perfectly by means of an appropriate installation, it is still impossible to avoid damage to the said heat installations. Of course, use of chemical additives is insufficient to completely remove sulfur and oxides thereof.

As demonstrated above, sulfur is an injurious and cumbrous impurity, notwithstanding it is chemically and inseparably coupled with the combustible material which is qualified by addition of sulfur in proper quantity during combustion. Sulfur is present in the combustible molecular structure of mineral fuel and a small quantity of which constitutes a molecular structure of hydrocarbon to sustain and utilize the combustibility of the heat source. The invention contrives to utilize the overall calorific value of the fuel by utilizing effectively the combustibility of sulfur contained in the commercially available fuel, in which the complete treatment of the sulfur oxide after combustion takes place by chemical adsorption into the calcium oxide having large affinity which is formed in the combustion chamber. As substantiated later, according to the invention a neutral atmosphere is formed in the combustion chamber so that the combustion zone which is the source of the public nuisance is converted into the complete treatment zone of the effluent gas and thus the generation of toxic products which damage the combustion chamber and pollute the atmosphere is completely prevented with the safe operation of the heat installations.

The calcium carbonate (amorphous lime stone) is an alkaline earth metallic compound including calcium metal, various elements and substances which are abundantly available in underground sources and has various characteristics for example suitability as a generating carrier of hydrogen which is likely to ionize. The calcium metal is boiled at a high temperature to generate vapor of single atoms and discharge free electrons.

In the conventional single combustion system, the spray of the oil and the dispersion form thereof are regarded as most important and many improvements thereof have been made in order to ensure perfect combustion. The actual operation, however, results in the following:

(1) Since the ignition distance and range are limited the spray is restricted to dispersion in the form of a spindle so that the complete atomization of the oil can not be achieved.

(2) Even the fine particles of oil sprayed in the best atomized form are prevented from intimately contacting with air due to the high density at the central zone of the dispersion of oil, resulting in the incomplete combustion. The concentrated dispersion prevents the diffusion of air which results in deficiency of air supply before the rise of temperature.

(3) The dispersion at the outer periphery is coarse according to the theory of dispersion and makes good contact with air but brings about smoke generation contrary to the theory of the complete combustion at the outer periphery of dispersion.

An anomaly of the above paragraph (3) is caused by poor combustion under the influence of the concentrated part at the central zone of dispersion of oil as mentioned in the above paragraph (2). Generally, the physical phenomena such as difficulty of obtaining fine particles by the oil spray, concentration as well as crudeness of dispersion and aggregtaion of particles during dispersion of oil are inevitable and accordangly any improvement of dispersion is impossible.

According to the invention, the stable spray of oil and the best form of dispersion different from the unstable spray and dispersion in the conventional single combustion system may be positively secured. This is a further advantage of the invention and the combustion form of spray and dispersion of oil which have been regarded as most difficult to obtain in the conventional combustion are achieved. That is, the solid fine particles of calcium carbonate are effective in the atomized spray and dispersion thereof. The oil is sprayed into the primary oil and immediately before the dispersion, the solid fine particles of the calcium carbonate are directed to the vicinity of the base portion of the said oil so as to embrace the sprayed oil and thus the embracing mixture is carried out by supplying secondary air under pressure so that the combustible substances in the dispersion are intimately mixed with the additives. Thus, the liquid phase of liquid particles and the solid phase of solid particles are finely divided in good order and by the addition of the additives, the unevenness of density in the dispersion of the combustible substances and aggregation of dispersed particles are positively prevented with the homogeneous mixing of the two different substances which are being converted into gas and solid oxide by the combustion.

According to the invention, the sprayed solid particles are uniformly distributed into the atomized oil and the mixed particles of liquid and solid materials float and are suspended in space so that the aggregation of oil particles is perfectly prevented by maintaining the total surfaces of particles large so that the mixing between these two different materials is well conducted. Consequently, the differences in concentration of dispersion between the central zone and outer periphery of the said dispersion as seen in the conventional single combustion mode are avoided. Still a further object of the invention is to ensure the stable maintenance of the burst combustion. Heretofore, self-combustion has not usually been practised to avoid the generation of explosion pressure. However, according to the invention the stable combustion is effectively carried out on the open grate of any commercially available boiler with safety under all conditions. That is, according to the invention the nascent oxygen is brought into contact with the combustible gas to cause a high temperature oxidation reaction.

In order to ensure complete combustion and to obtain high temperature combustion, the flame may preferably be shortened. According to the invention, the flame is divided and shortened by addition of calcium carbonate and due to the reversible reaction of the oxygen an intensive orange ignition flame is generated showing oxyhydrogen flame and acetylene flame. It has been confirmed by the flame spectrum that calcium metal boils at a high temperature to produce monoatomic vapor with discharge of free electrons.

The chain thermo-chemical reaction of combustion is important in this invention and for this purpose the solid fine particles of calcium oxide are continuously supplied to the combustion chamber to form a membranous zone in the combustion chamber, which serves as a layer wall having shielding ability just the same as a wall of the settled reactor and thus the chain reaction is stimulated actively. The wall of calcium oxide thus formed prevents heat loss by its shielding effect and accordingly a proper and stable combustion may be achieved without necessitating any damper operation and irrational combustion by forced air supply which incurs heat loss.

Further, the treatment of vanadium which is more detrimental to a boiler than sulfur must be considered. This toxic vanadium in very small quantity resides in the combustion and is vaporised by heat or oxidized by combustion into vanadium pentoxide to produce ash which when adhered to the surface of the hot metallic material corrodes the surface protective layer of the said metallic material. Further, the sulfur oxide acts on the said corroded part to form a film which produces rapid corrosion. However, this noxious vanadium is also effective to impel the combustion and the chemical effect that the heat and temperature are sustained positively in the presence of a very small quantity of vanadium can not be disregarded. According to the invention, the said vanadium is caught in the membranous zone of calcium oxide and solidified as calcium vanadate so that the vanadium attack is prevented. The membranous zone of calcium oxide formed according to the invention has the ability to neutralise the acidic atmosphere in the combustion chamber so that the production of toxic substances is suppressed.

DESCRIPTION OF THE PREFERRED EMBODIMENTS

In the operation of combustion, the oil is sprayed with the preheated primary air and to the vicinity of the base portion of the sprayed oil immediately before dispersion thereof are directed the solid fine particles of calcium carbonate with the pre-heated secondary air so as to bracket the sprayed oil with powerful impact. The oil immediately before the vaporisation is finely divided into the homogeneous dispersion of the fine particles of oil and calcium carbonate with reduction of viscosity and fluidity. The heating takes place with the hot air injection and the air pressure is sufficient to mix fine particles of fuel into the oil spray. The mixing proportion of the calcium carbonate is preferably 10–40% by weight in respect of the fuel and it may be modulated in accordance with the combustion velocity. Calcium carbonate ($CaCO_3$) to be added to the fuel contains preferably more than 54% by weight of CaO but may contain more than 43% by weight of $CO_2$ and the particle size is preferably more than 150 meshes. Calcium carbonate may be replaced by dolomite of the same proportion as calcium carbonate.

Without limiting this invention, the following examples are given to illustrate possible preferred modes of operation. Parts mentioned are by weight.

EXAMPLE

Type and specification of sample boiler

Tsunekichi Model CD–100 (Economiser), two units (Nos. 1 and 2) Rotary heavy oil burner spray combustion apparatus (heavy oil heater and vapor coil heating).

| | |
|---|---|
| Heating surface _____$m.^2$__ | 99.00 |
| Volume of combustion chamber _____$m.^3$__ | 12.54 |
| Equivalent evaporation _____t./h__ | 3.86 |
| Funnel _____m__ | 24 x 1 |
| Draft _____ | Forced |

Sample fuel (C heavy oil)

Elementary analysis and calorific value (heating to 70.5° C. on use).

| | | |
|---|---|---|
| Carbon | Percent | 85.53 |
| Hydrogen | do | 11.47 |
| Sulfur | do | 2.80 |
| Moisture | do | 0.20 |
| Viscosity (50° C.) | | 7.9 |
| Calorific value | kcal./kg | 10350 |

Sample calcium carbonate (amorphous)

| | | |
|---|---|---|
| $CO_2$ | Percent | 43.5 |
| Particle size | mesh | 150 |

An apparatus for adding the calcium carbonate is temporarily installed at both side of the heavy oil burner means and the hot substances at 100° C. are sprayed by air pressure.

Comparison test (1) The operation was carried out with vapor volume of 2.5 t./h. and the surplus vapor was discharged into the atmosphere without any suppression and variation of load was prevented to ensure stability in operation.

(2) A-No. 1 boiler was used for the conventional single combustion method and B-No. 2 boiler was used for embodying the method according to the invention. In order to ensure accuracy of testing these two boilers were operated simultaneously under the same conditions such as atmospheric and room temperatures, feed temperature etc.

(3) The temperatures were measured by an optical pyrometer and a flame pyrometer at the ignition entrance, intermediate viewing aperture, boiler top and boiler end aperture and the average values were taken as measured values. The thermocouples were fixedly arranged at the boiler top and the boiler terminal. Further, the measurement value of the temperature by spectrum was taken from the determined value on the D-bright line of spectrophotographs.

COMPARISON TABLE OF TEMPERATURES IN COMBUSTION CHAMBER

| | First viewing aperture (at ignition inlet) | Second viewing aperture (at intermediate) | Boiler top | Boiler terminal |
|---|---|---|---|---|
| Conventional single combustion, ° C | 795 | 1,230 | 1,080 | 845 |
| Combustion according to the invention, ° C | 953 | 1,385 | 1,225 | 984 |

(4) The effluent gas ($CO_2\%$) was measured by Orsat apparatus and Lauter $CO_2$ meter with the average values.

| | Percent |
|---|---|
| A-No. 1 boiler | 11.30 |
| B-No. 2 boiler | 15.60 |

(5) Damper opening and Ringerman smoke concentration were as follows:

| | Damper opening | Smoke concentration |
|---|---|---|
| Conventional single combustion (A-No. 1 boiler) | full | 1.85 |
| Combustion according to the invention (B-No. 2 boiler) | ¾° | 0.00 |

MEASUREMENT OF CONCENTRATION OF HYDROGEN

[Ion (pH value) and Nature of Atmosphere]

| | | |
|---|---|---|
| A-No. 1 boiler (conventional method) | pH 3.7 | Acidic. |
| B-No. 2 boiler (new method) | pH 6.8 | Neutral. |

REMARKS.—The sample was recovered from the side of the $CO_2$ meter entrance of the combustion chamber and measured after 5 hours immersion in pure water.

OBSERVATION OF FLAME ARC WITH COLORED GLASSES FOR COMBUSTION CHAMBER

| | Length of flame arc | Presence of smoke generation | High temperature radiation | Transparency in combustion chamber |
|---|---|---|---|---|
| A-No. 1 boiler | Long | Observed | None | Opaque. |
| B-No. 2 boiler | Short | None | Observed | Transparent. |

RESULTS OF COMPARISON TESTS

| | Conventional method (A-No. 1 boiler) | New method (B-No. 2 boiler) |
|---|---|---|
| Time of test (h.) | 3 | 3 |
| Quantity of fuel used (kg./kg.) | 538 | 452 |
| Total calorific value of fuel (kcal./kg.) | 10,350 | 10,350 |
| Net calorific value of fuel (kcal./kg.) | 9,730 | 9,730 |
| Quantity of lime stone (kg./kg.) | | 126 |
| Amount of evaporation | 6,885 | 6,945 |
| Water temperature at inlet (° C.) | 17.7 | 17.7 |
| Water temperature at outlet (° C.) | 182.0 | 189.0 |
| Vapor pressure (kg./cm.$^2$) | 5.0 | 5.1 |
| Real evaporation multiple (kg./kg.) | 11.8 | 15.4 |
| Converted evaporation multiple (kg./kg.) | 13.8 | 17.9 |
| Boiler efficiency (percent) (main body) | 71.0 | 92.0 |
| Total boiler efficiency (percent) | 76.2 | 99.0 |

TEMPERATURES OF FLAME ARC MEASURED FROM SPECTRUM

| Sorts of flame arc | Definition on D-bright line | Measurement, ° C Spectrum | Other |
|---|---|---|---|
| Coal gas and air | Indistinct | 1,500 | 1,460 |
| Mecker burner | Weak | 1,800 | 1,780 |
| Carbon monoxide and air | do | 1,980 | 1,978 |
| Hydrogen and air | Medium | 2,045 | 2,047 |
| Gasoline motor | Distinct | 2,310 | 2,373 |
| Methane and air | Strong | 2,800 | 2,750 |
| Hydrocarbon group and air | Medium | 2,030 | |
| Hydrocarbon group, oxygen and air (in the presence of calcium oxide). | Very strong | 2,950 | |

The measurement of calorific value of calcium carbonate is presently impossible, so that the temperature taken by the spectrum may be subjected to trial to determine an approximate value in question. Further, the luminescence of calcium ion flame showing orange calcium metal flame and the high temperature luminescence essentially showing golden calcium on the D-bright line have been measured by the flame analyzer.

As illustrated above, it has been discovered that the calcium carbonate per se has the ability to act as the heat source and it is substituted for approximately 30% by weight of petroleum fuel so that the fuel consumption may be considerably reduced as compared with the conventional single combustion system.

In the conventional single combustion system, the combustible gas requires several steps of reaction to arrive at final combustion and during these reactions the incomplete combustion occurs. On the contrary, according to the invention the combustible gases burst by the decomposition of calcium carbonate without entailing incomplete combustion and producing any toxic substance. Slag of calcium carbonate may be recovered by an appropriate collector associated with the combustion chamber.

It will be understood that the invention is not to be limited to the exact examples described, but that various changes and modifications may be made without departing from the spirit and scope of the invention, as defined in the appended claims.

What I claim is:

1. A method of bursting liquid fuel, which comprises mixing liquid fuel with 10–40% by weight of finely divided calcium carbonate, spraying the mixture into a combustion chamber, and burning the sprayed mixture in the combustion chamber.

2. A method as claimed in claim 1, in which said calcium carbonate contains more than 54% by weight of calcium oxide and more than 43% by weight of carbon dioxide.

3. A method of bursting liquid fuel, which comprises mixing liquid fuel with 10–40% by weight of dolomite, spraying the mixture into a combustion chamber, and burning the sprayed mixture in the combustion chamber.

References Cited

UNITED STATES PATENTS

| 2,781,005 | 2/1957 | Taylor et al. | 431—4 |
| 2,843,200 | 7/1958 | Rocchini | 431—4 XR |
| 3,089,539 | 5/1963 | Vermillion et al. | 431—4 |
| 3,320,906 | 5/1967 | Domahidy. | |

FREDERICK L. MATTESON, JR., Primary Examiner

HARRY B. RAMEY, Assistant Examiner